Sept. 30, 1930.  K. WINKLER  1,777,190
WOODEN PLATE COMPOSED OF SEPARATE PLATES OR STRIPS
Filed Feb. 2, 1928
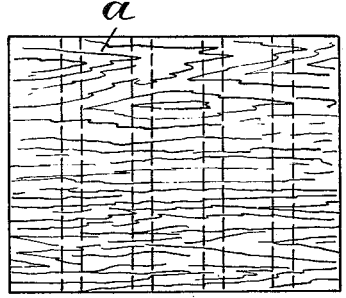
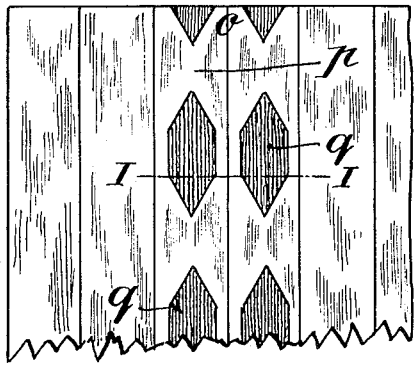
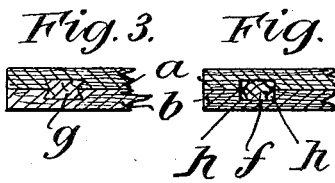
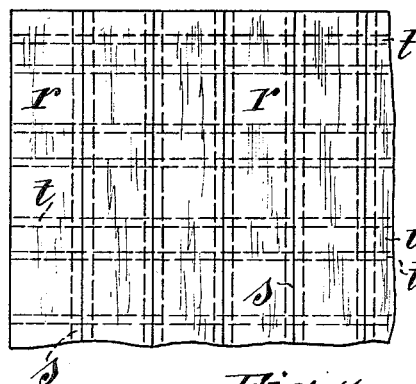
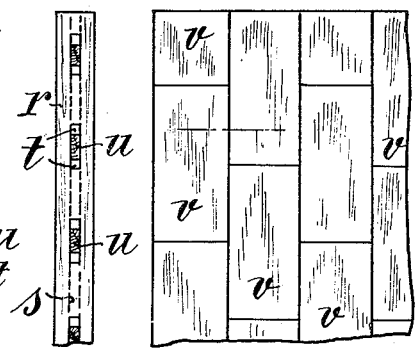
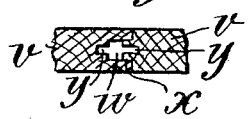
Inventor:
Kurt Winkler
by:
Marks & Clerk
Attorney Patented Sept. 30, 1930

1,777,190

UNITED STATES PATENT OFFICE

KURT WINKLER, OF FINSTERWALDE, GERMANY

WOODEN PLATE COMPOSED OF SEPARATE PLATES OR STRIPS

Application filed February 2, 1928, Serial No. 251,443, and in Germany April 26, 1927.

This invention relates to a wooden plate composed of separate plates or strips, and has for its object to provide a plate which will not warp after being in use for a long period.

For forming the wooden plate according to the invention, the circumstance is made use of, that by making deep incisions, recesses by milling and the like, the detrimental warping of the wood can be counteracted. The idea underlying the invention consists in arranging the incisions in such a manner that channels are formed in the built-up wooden plate. These channels are either filled entirely or in part, thus locking the separate plates and providing a protection against warping in the composite plate, or the channels are left unfilled so that the air can flow to the glued places and a uniform drying of the glue in the composite plate is obtained. In composite plates of the known kind one disadvantage was that at the edges of the composite glued plate the glue dried more rapidly than in the inner part, thus giving the plate an initial tendency to warp.

Several constructional examples according to the present invention are shown in the accompanying drawing in which Fig. 1 is a plan view of a composite plate consisting of two plates of half the total thickness, Fig. 2 a cross-section through the plate shown in Fig. 1, Fig. 3 a cross-section of a modified form of the composite plate of the kind shown in Fig. 1, Fig. 4 a cross-section through another modified form of a composite plate such as that shown in Fig. 1, Fig. 5 a cross-section through a wooden plate composed of strips in which the fibre runs longitudinally of the strips.

Fig. 6 a plan view in part section of a composite wooden plate similar to that shown in Fig. 1.

Fig. 7 an end view of the wooden plate shown in Fig. 6, partly in section on line I—I of Fig. 6, Figs. 8 and 9 a plan view and an end view of a composite plate of a further constructional form, in which the strips have the fibre running longitudinally of the same, Fig. 10 a wooden plate composed of separate lengths of strips, Fig. 11 a cross-section through two adjacent marginal parts of two strips of the plate shown in Fig. 10 and Fig. 12 the two strips of Fig. 11 when put together.

According to Figs. 1 to 4, the wooden plate is composed of two separate plates $a$ and $b$ of each of which the height is approximately half the thickness of the whole plate. The plates are superposed in such a manner that the fibre runs in the same direction. As the separate fibres will always show deviations from the parallel direction there will always be a certain amount of locking. Through the grooves $c$ and $d$ cut in each wooden plate transversely of the direction of the fibres the effect is still further increased. Finally the complete result aimed at is obtained by strips $e$, $f$ and $g$ having the fibre running longitudinally being inserted in the internal channels formed by the grooves $c$ and $d$ when the plates $a$ and $b$ are put together. In the constructional example shown in Fig. 2, the locking strip $e$ fills the rectangular channel completely. In the example shown in Fig. 3 the cross-section of the channel and of the locking strip $g$ is made dovetailed, the entire cross-sectional area of the channel being again completely filled. The dovetail shape of the locking strip prevents the plates being separated and thus allows of the plate being put together without the necessity of glueing the joints. In the wooden plate shown in Fig. 4 the longitudinal joints of the locking strip $f$ are radiused out, so that in the channel of rectangular cross-section four air passages $h$ are produced which will ensure the glue drying properly. The constructional form shown in Fig. 4 can be still further improved by the provision of longitudinal channels.

In the composite plates shown in Figs. 1 to 4, there is the special advantage, that the usual three-thickness locking of the composite plate is not required and that the plates can be used in the state shown in the drawing, for instance as table tops, writing table tops, counter tops, parts of the walls of furniture and the like. The manufacturing costs are thus considerably less than those of the known plates with three-fold locking.

In Fig. 5 the simplest construction of the invention is shown. The plate is composed of separate strips $i$ in which the fibre runs longitudinally and which are butted together, the adjacent edges being grooved so that longitudinal channels $k$ are formed. These channels extend along the middle of the edges of the plates and can be formed in various ways. In Fig. 5 various forms of cross-section are shown, for instance, a rectangular form $l$ a rhomboidal form $m$, a circular form $n$ and so on. The channels provide in the first instance that the glue shall dry uniformly over the entire surface of the wooden plate, as air has access uniformly all over. The form of channel has the further effect of counteracting the warping of the wood. When the composite plate is provided with a not too thin upper covering plate and a similar lower covering plate any warping of the plate is made practically impossible.

In Figs. 6 and 7 an improvement of the constructional form shown in Fig. 5 is shown, transverse channels $p$ being provided in addition to the longitudinal channels $o$. The form of the transverse channels is such that, in the longitudinally fibred strips, pillars $q$ of hexagonal cross-section are left standing. When the separate channels are placed closely together, the hexagonal cross-sectional form of the pillars merges into a rhomboidal cross-sectional form. Through this peculiar formation of channel, which to a great extent runs obliquely, any warping of the wood is counteracted in a still more effective manner than in Fig. 5. In this constructional form as well the glue dries uniformly at all points.

The plate shown in Figs. 8 and 9 is also composed of longitudinally fibred strips $r$. Longitudinal channels $s$ and transverse channels $t$ are again provided, the difference as compared with the plate shown in Figs. 6 and 7 being that the transverse channels $t$ extend straight through the plate and are partially filled by separate longitudinally fibred strips $u$. These strips provide still further security against the plate warping.

It is also not necessary to glue the joints and no special locking is required.

The plate shown in Figs. 10, 11 and 12 is composed of separate strip-shaped pieces $v$. Figs. 11 and 12 show how the adjacent edges of the said pieces are profiled. The strips engage in one another with grooves $w$ and tongues $x$, the arrangement being such that a channel $y$ is formed at each joint. The plate is thus intersected by an unbroken network of channels, so that in this case as well the desired effect is obtained as regards the drying of the glue and the tendency of the wood to change its form.

What I claim is:

A wooden plate composed of single pieces joined one to the other by glue and presenting continuous and uninterrupted opposite outer plate surfaces, the plate having internal channels located between the uninterrupted outer plate surfaces and open to the glued joints and to the atmosphere, and additional internal channels located between the outer plate surfaces and extending in angular relation to the first mentioned channels, and locking strips located in certain of said channels, said strips only partially filling said channels to permit passage of air therethrough.

In testimony whereof I have signed my name to this specification.

KURT WINKLER.